United States Patent
Soo et al.

(10) Patent No.: US 8,365,214 B2
(45) Date of Patent: Jan. 29, 2013

(54) SYSTEMS AND METHOD FOR DETERMINING VISUAL MEDIA INFORMATION

(75) Inventors: Armstrong Soo, San Ramon, CA (US); Bernard Ku, Austin, TX (US); Zhi Li, Martinez, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 646 days.

(21) Appl. No.: 11/940,841

(22) Filed: Nov. 15, 2007

(65) Prior Publication Data

US 2009/0133085 A1    May 21, 2009

(51) Int. Cl.
*H04N 7/167* (2011.01)

(52) U.S. Cl. ......... 725/31; 725/116; 725/117; 725/145; 725/146; 725/147; 725/115; 380/239

(58) Field of Classification Search ..................... None
See application file for complete search history.

(56) References Cited

U.S. PATENT DOCUMENTS

| | | | |
|---|---|---|---|
| 5,541,662 A * | 7/1996 | Adams et al. | 348/460 |
| 6,138,147 A | 10/2000 | Weaver et al. | |
| 6,282,713 B1 * | 8/2001 | Kitsukawa et al. | 725/36 |
| 6,373,960 B1 * | 4/2002 | Conover et al. | 382/100 |
| 6,490,405 B1 | 12/2002 | Speed et al. | |
| 6,970,640 B2 | 11/2005 | Green et al. | |
| 7,218,635 B2 | 5/2007 | Haddad | |
| 2002/0032906 A1 * | 3/2002 | Grossman | 725/42 |
| 2002/0078467 A1 * | 6/2002 | Rosin et al. | 725/110 |
| 2003/0156342 A1 | 8/2003 | Yap et al. | |
| 2003/0159143 A1 * | 8/2003 | Chan | 725/41 |
| 2004/0008970 A1 | 1/2004 | Junkersfeld et al. | |
| 2005/0185795 A1 * | 8/2005 | Song et al. | 380/218 |
| 2006/0047967 A1 * | 3/2006 | Akhan et al. | 713/176 |
| 2006/0153296 A1 * | 7/2006 | Deng | 375/240.12 |
| 2006/0156358 A1 * | 7/2006 | Adolph et al. | 725/90 |
| 2007/0186228 A1 * | 8/2007 | Ramaswamy et al. | 725/14 |
| 2007/0266414 A1 * | 11/2007 | Kahn et al. | 725/113 |
| 2007/0271300 A1 * | 11/2007 | Ramaswamy | 707/104.1 |
| 2007/0294738 A1 * | 12/2007 | Kuo et al. | 725/116 |
| 2009/0083781 A1 * | 3/2009 | Yang et al. | 725/20 |

FOREIGN PATENT DOCUMENTS

WO    WO 2005079501 A2 *    9/2005

* cited by examiner

*Primary Examiner* — Dominic D Saltarelli
*Assistant Examiner* — Jason J Chung
(74) *Attorney, Agent, or Firm* — Guntin & Gust, PLC; Andrew Gust

(57) ABSTRACT

A set top box includes a processor. The processor is configured to receive a digital video stream, calculate a hash of an I-Frame within the digital video stream, and submit the hash to a server. The processor is further configured to receive location information in response to submitting the hash to the server.

19 Claims, 7 Drawing Sheets

SYSTEMS AND METHOD FOR DETERMINING VISUAL MEDIA INFORMATION

FIELD OF THE DISCLOSURE

The present disclosure generally relates to communications networks, and more particularly relates to systems and methods for determining visual media information.

BACKGROUND

Consumers today enjoy a wide variety of video sources including broadcast television, video on demand, streaming video, and physical media such as DVDs. The widespread use of digital video recorders (DVRs) enables consumers to view video content at a time convenient for the consumer rather then when the video content is broadcast. More recently, video enabled mobile devices, such as cellular telephones and portable media players, have enabled consumers to view video content at virtually any location. Traditional ways of determining popular content, such as measuring the number of viewers tuned into a channel when a program is broadcast, are difficult or impossible to adapt to time-shifted and mobile viewing habits.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
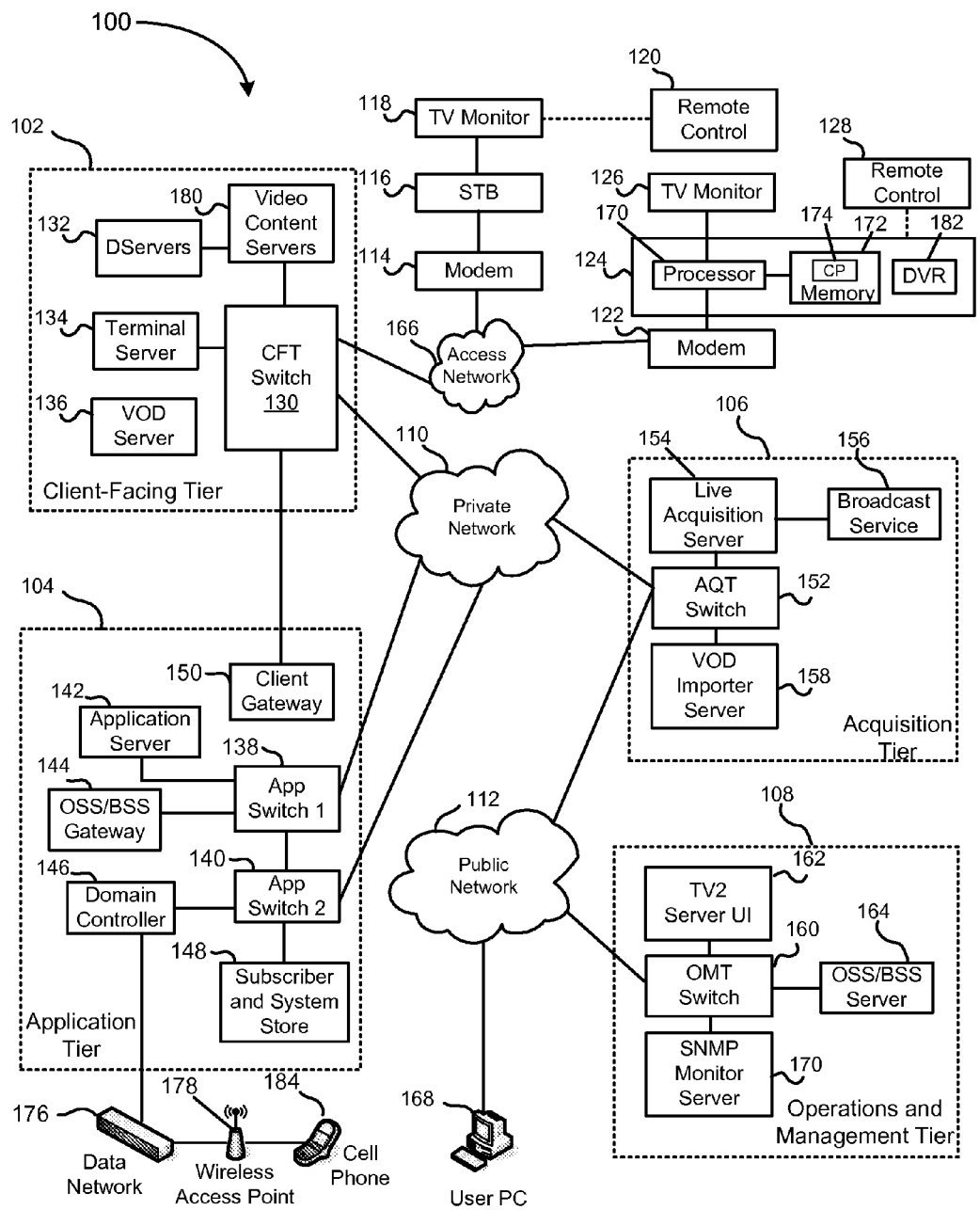
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
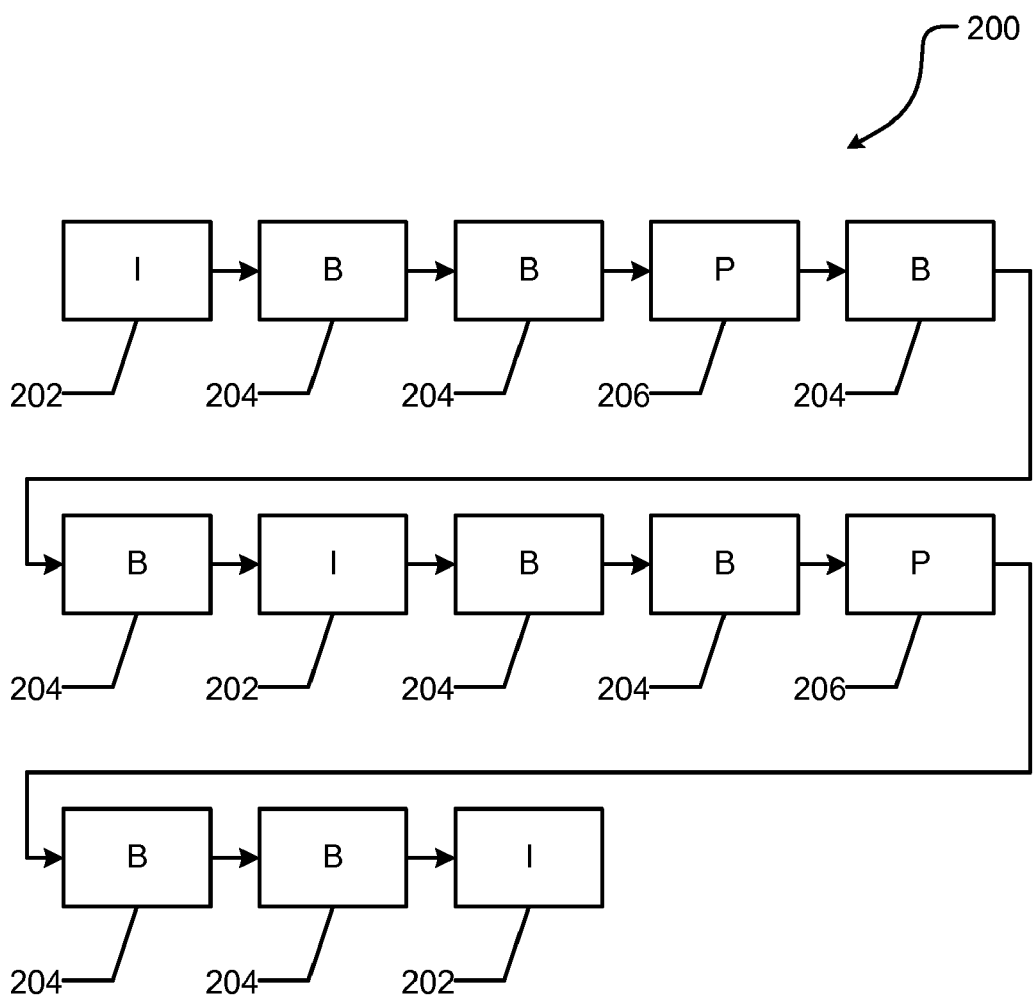
FIG. 2 is a block diagram of a digital video stream.

FIG. 2 shows a block diagram illustrating a digital video stream 200 that can include I-Frames 202, B-Frames 204, and P-Frames 206. Digital video stream 200 can be encrypted, such as by encrypting each frame of the digital video stream 200. Each I-Frame 202 can encode a single frame of video. Each I-Frame 202 also can be independent of the other frames of the digital video stream 200, and can be decoded without reference to the other frames of the digital video stream 200. In contrast, each B-Frame 204 and each P-Frame 206 can be encoded relative to reference frames. Reference frames can include I-Frames 202 and P-Frames 206. Each B-Frame 204 and each P-Frame 206 can describe a frame by describing the change or motion between the current frame and a reference frame and may require information from the reference frame during decoding. P-Frames 206 can be encoded relative to a closest previous reference frame, whereas B-Frames 204 can be encoded with reference to a closest previous reference frame, a closest next reference frame, or a combination thereof.

Figure 3:
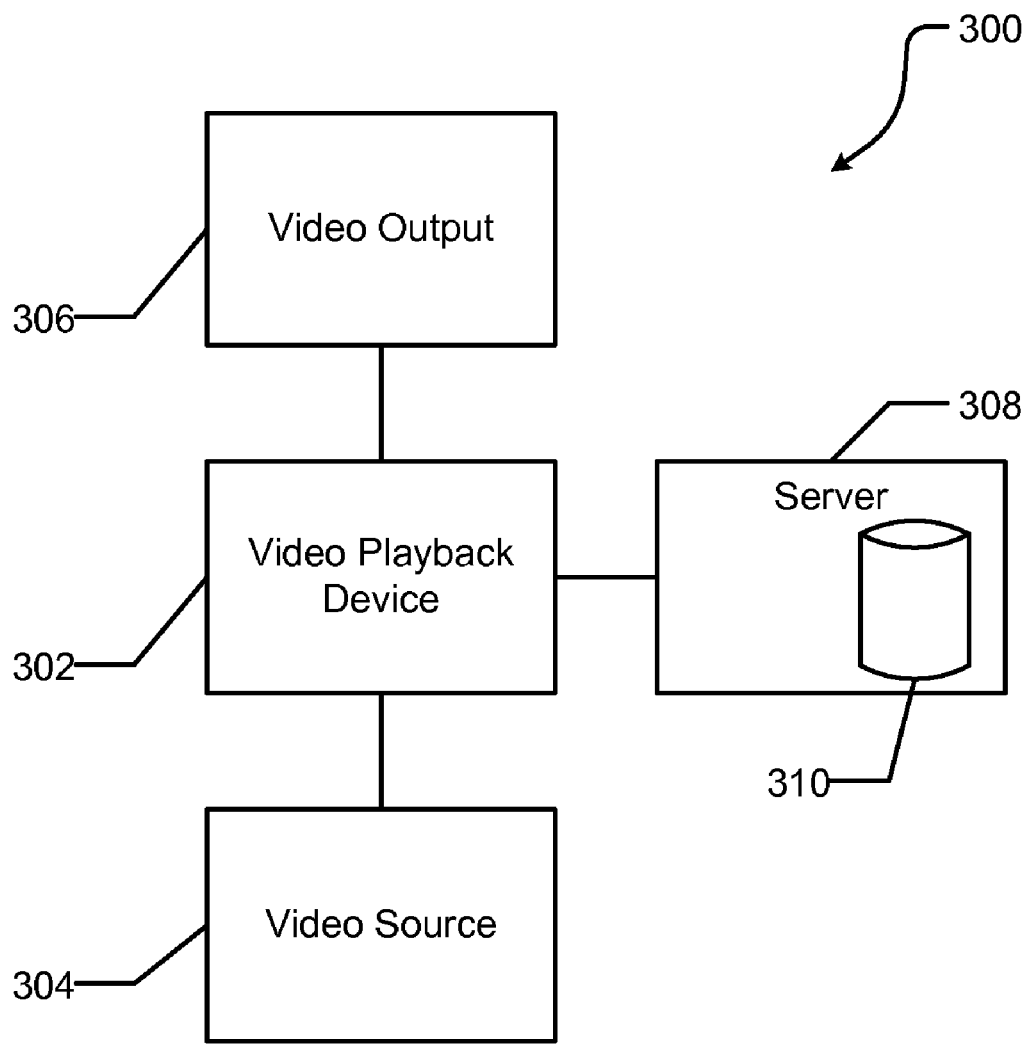
FIG. 3 is a block diagram illustrating a system for determining a location within a digital video stream.

FIG. 3 shows a block diagram illustrating a system 300 for determining a current location within a digital video stream, such as digital video stream 200. The system 300 includes a video playback device 302, a video source 304, a video output 306, and a video information server 308. The video information server can include an I-Frame database 310. The video playback device 302 may be an STB such as STB 124. Alternatively, the video playback device 302 may be a media player such as a DVD player, or a video display such as TV monitor 126. Additionally, the video playback device 302 may be implemented as software, hardware, or a combination thereof and incorporated into a computer such as PC 168. In another embodiment, the video playback device 302 may be incorporated into mobile device such as cellular telephone 184. The video playback device 302 receives a digital video stream from the video source 304. The video source 304 may include physical media such as a DVD, a streaming digital video such as an IPTV data stream, or a digital video recorder such as DVR 182. The video source 304 may provide either an encrypted digital video stream or an unencrypted digital video stream. The video playback device 302 can provide a video signal to the video output 306. The video output 306 may be an integrated display such as when the video playback device is incorporated into TV monitor 126. Alternatively, the video output may be an external device such as TV monitor 126 when the video playback device 302 is STB 124. Additionally, the video output 306 may be a video recording device such as DVR 182 or a DVD recorder. The video playback device 302 can calculate a hash for an I-Frame within the digital video stream. When the digital video stream is encrypted, the hash may be calculated without decrypting the digital video stream for playback. The video playback device 302 may provide the hash of the I-Frame to the video information server 308. The video information server 308 can retrieve location information from the I-Frame database 310. The location information may include a timestamp representing the location of the I-Frame within the digital video stream. The video information server 308 can provide the location information to the video playback device 302. Alternatively, the video playback device 302 may retrieve the location information from a local database that is periodically updated from the video information server 308.

Figure 4:
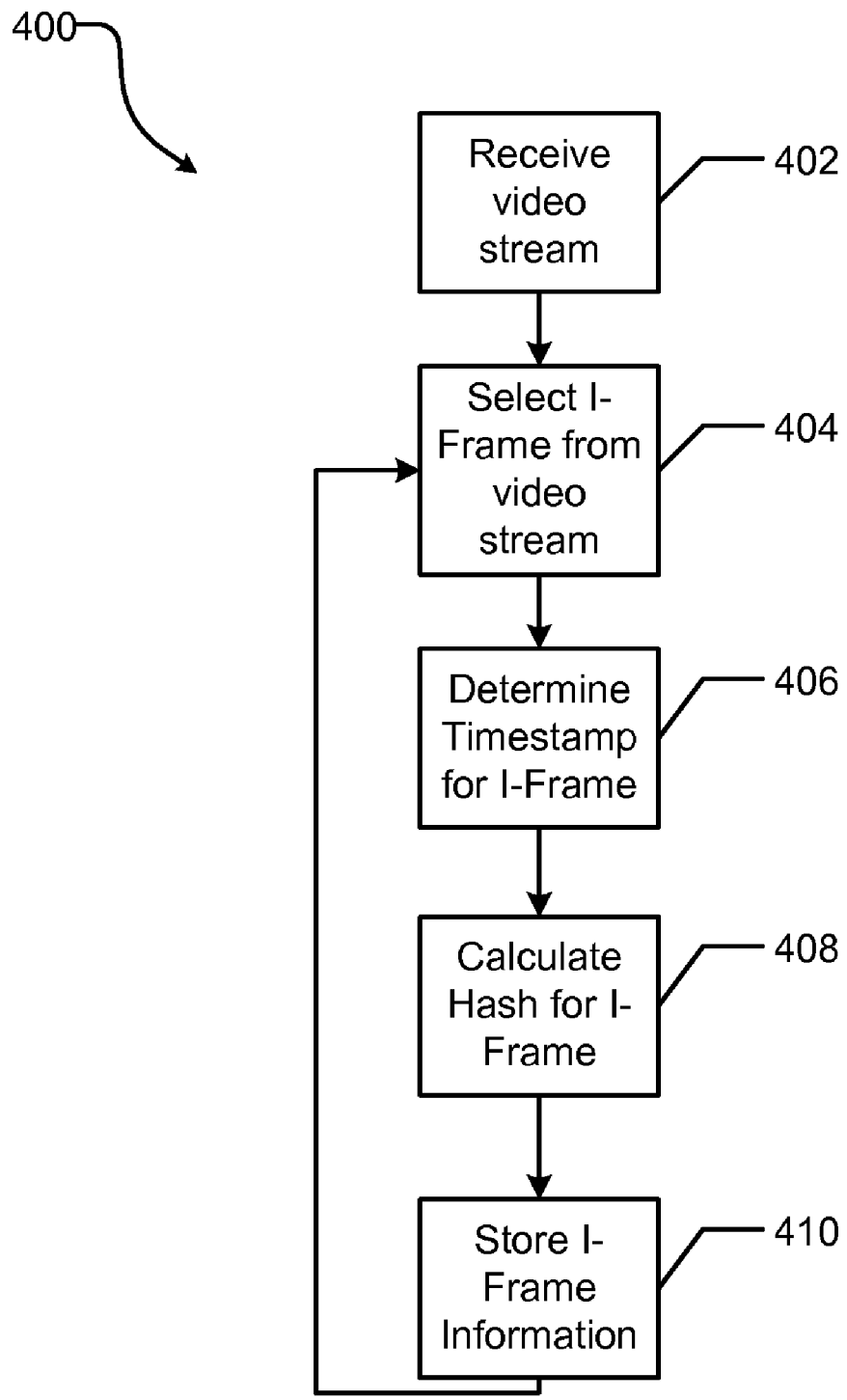
FIG. 4 is a flow diagram illustrating a method for determining a location within a digital video stream.
Figure 5:
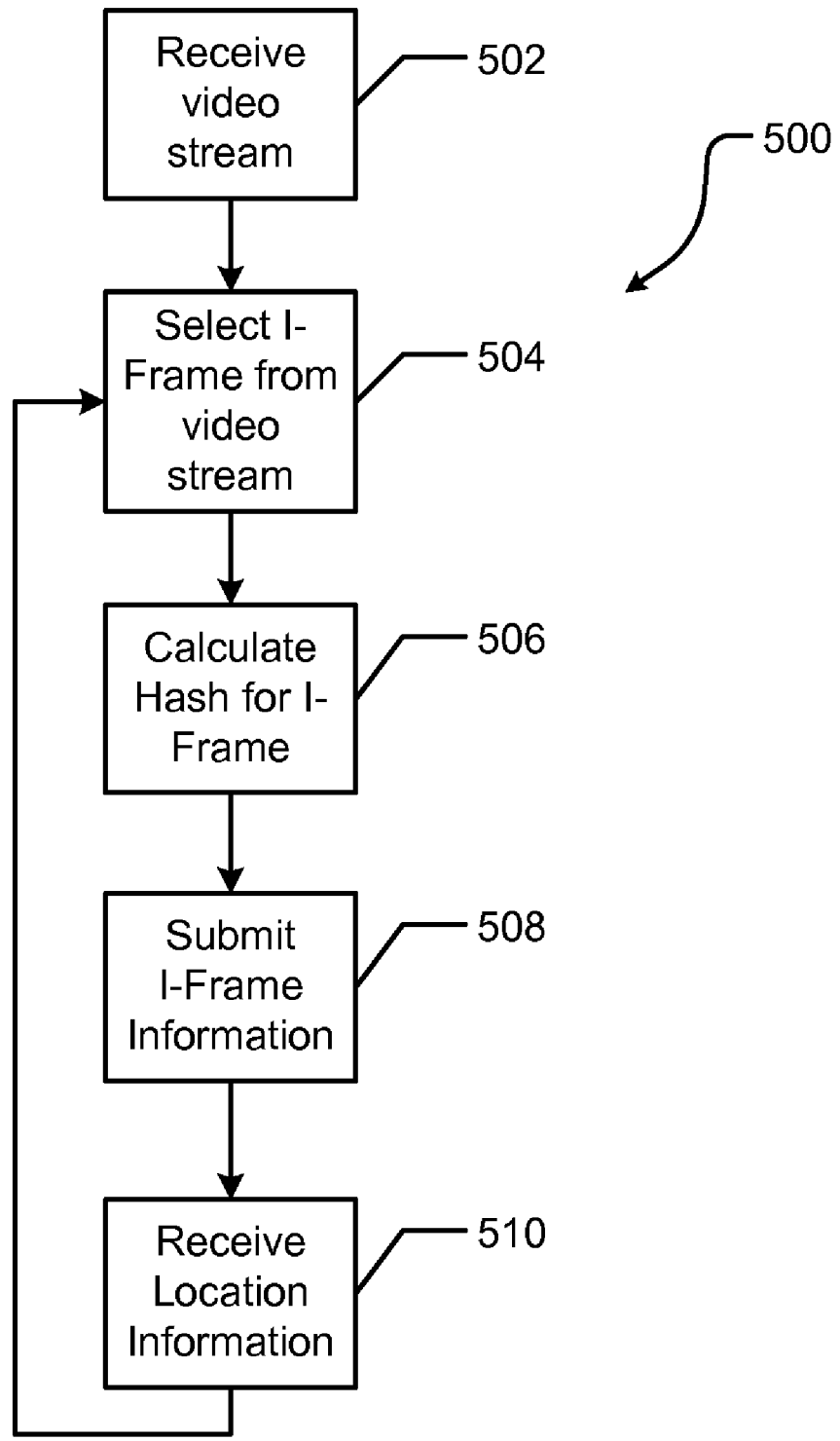
FIG. 5 is a flow diagram illustrating a method for determining a location within a digital video stream during playback.

FIG. 4 shows a flow diagram illustrating a method 400 for determining a location within a digital video stream, such as digital video stream 200. As illustrated at 402, a video information device, such as video playback device 302 or video information server 308, receives the digital video stream. The digital video stream can include content, such as a movie, a television serial, or a live event. The video information device selects an I-Frame, such as I-Frame 202, from within the digital video stream, at 404. I-Frames can occur periodically throughout the digital video stream, such as about every 0.5 seconds. At 406, the video information device determines a timestamp representing the location of the I-Frame within the digital video stream. For example, the timestamp may be a time such as a number of tenths of seconds since the beginning of the digital video stream. As illustrated at 408, the video information device can calculate a hash of the I-Frame. Generally, hashes of similar data are significantly different. For example, a first I-Frame may be nearly identical to a second I-Frame, such as when only a small change has occurred in a scene. The hash of the first I-Frame can be significantly different from the hash of the second I-Frame, such that the first I-Frame can be distinguished from the second I-Frame based on the difference between the respective hashes. Generally, the algorithm used should generate a hash of sufficient length to have a high likelihood of providing a unique hash to each I-Frame of the digital video stream. In an exemplary embodiment, the algorithm can generate a hash of 128-bits. For example, the MD5, Blowfish, 3DES, and AES algorithms can generate a 128-bit hash. In another embodiment, the hash may be smaller, such as a 56-bit hash. In an alternate embodiment, the hash may be larger, such as 192 bits or 256 bits. At 410, the hash and the timestamp may be stored in a database, such as I-Frame database 310. Additionally, a title corresponding to the content of the digital video stream may be included in the database. At 404, the video information device may select another I-Frame. When populating the I-Frame database as described, the video information device may calculate a hash for every I-Frame in the digital video stream FIG. 5 shows a flow diagram illustrating a method 500 for determining a location within a digital video stream during playback. As illustrated at 502, a video playback device such as video playback device 302 receives a digital video stream such as digital video stream 200. At 504, the video playback device selects an I-Frame such as I-Frame 202 from within the digital video stream. The video playback device can calculate a hash of the I-Frame, as illustrated at 506. The hash can be calculated for the I-Frame as previously described. At 508, the video playback device can submit the hash of the I-Frame to a video information server, such as video information server 308. At 510, the video playback device may receive location information from the video information server. The location information can include a timestamp corresponding to the location of the I-Frame within the digital video stream. Additionally, the video information server may provide instructions to the video playback device based upon the location information. Alternatively, the video playback device may retrieve the timestamp from a local database. The local database may be periodically updated from the video information server. The video playback device may select another I-Frame from the digital video stream, as illustrated at 504. In an exemplary embodiment, the video playback device may calculate a hash for a subset of I-Frames within the digital video stream. For example, the video playback device may calculate a hash for at least one I-Frame per sixty seconds of the digital video stream, preferably at least one I-Frame per five to fifteen seconds.

In an exemplary embodiment, the video playback device can use the location information to synchronize the digital video stream with a data stream such as a second digital video stream, an audio file, or a text file. For example, the video playback device may combine the digital video stream with an audio file to provide an alternate audio track to the video content. The video playback device can match a portion of the data stream to the digital video stream based on the location information. The video playback device may combine the portion of the data stream with the digital video stream to provide synchronized playback.

Figure 6:
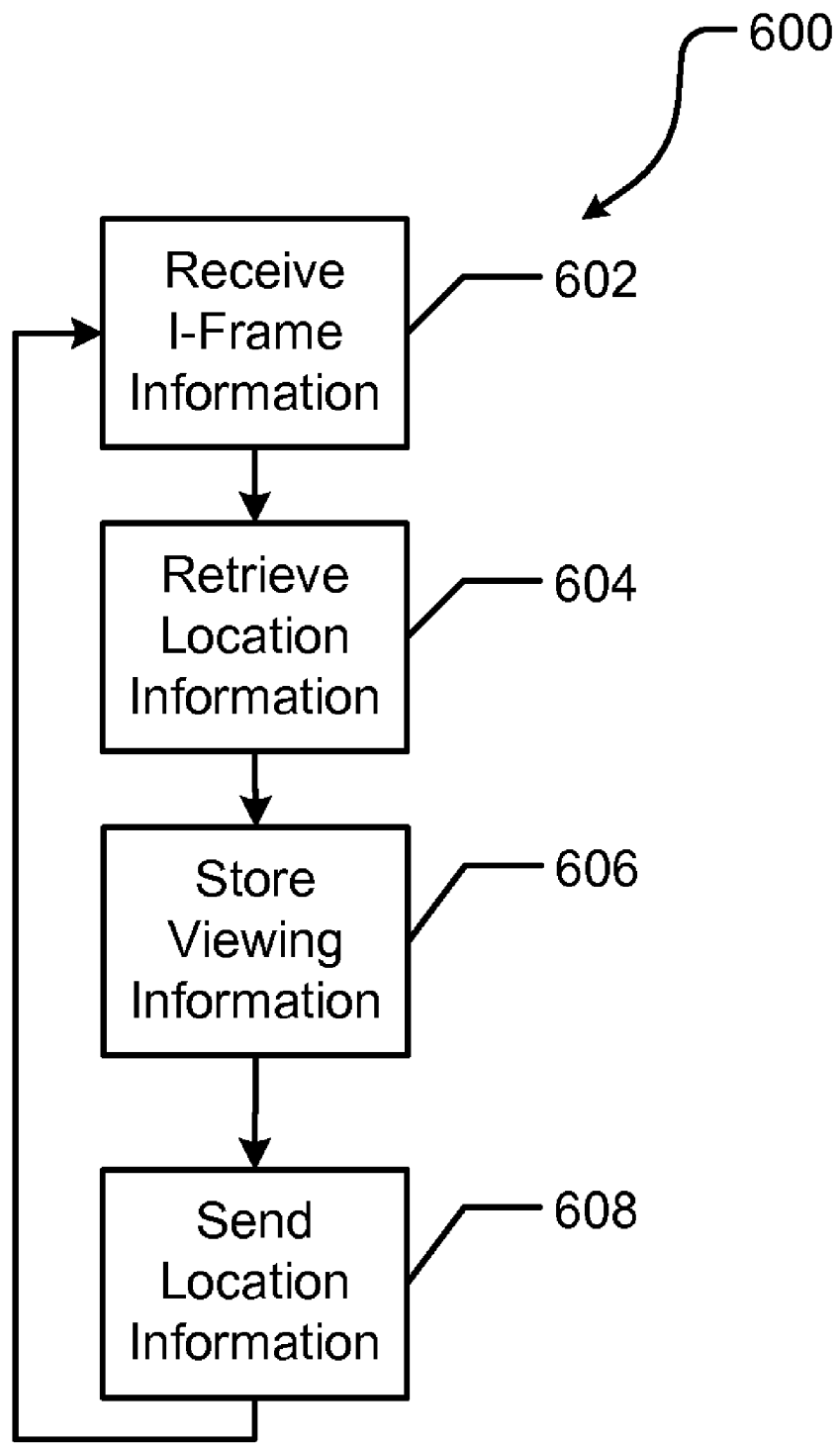
FIG. 6 is a flow diagram illustrating a method for providing a location within a digital video stream.

FIG. 6 shows a flow diagram illustrating a method 600 providing a timestamp based on a hash of an I-Frame, such as I-Frame 202. At 602, a video information server, such as video information server 308, can receive a request from a video playback device, such as video playback device 302. The request can include a hash of an I-Frame within a digital video stream and a title of the content of the digital video stream. The request can further include a device or subscriber identification (ID). At 604, the server retrieves location information from a database such as I-Frame database 310. The location information can include a timestamp corresponding to a location of the I-Frame within the digital video stream. At 608, the video information server may store information in a viewers database. For example, the information may include the title, the timestamp, the device or subscriber ID, and the current time. The viewers database may be used to track the number of subscribers viewing a title and the time subscribers view a title such as when the title is originally aired, when viewing is time-shifted, and when the title is viewed multiple times. At 610, the video information server may provide the location information to the video playback device. The server may receive another request, as illustrated at 602, from the same or an additional video playback device.

Figure 7:
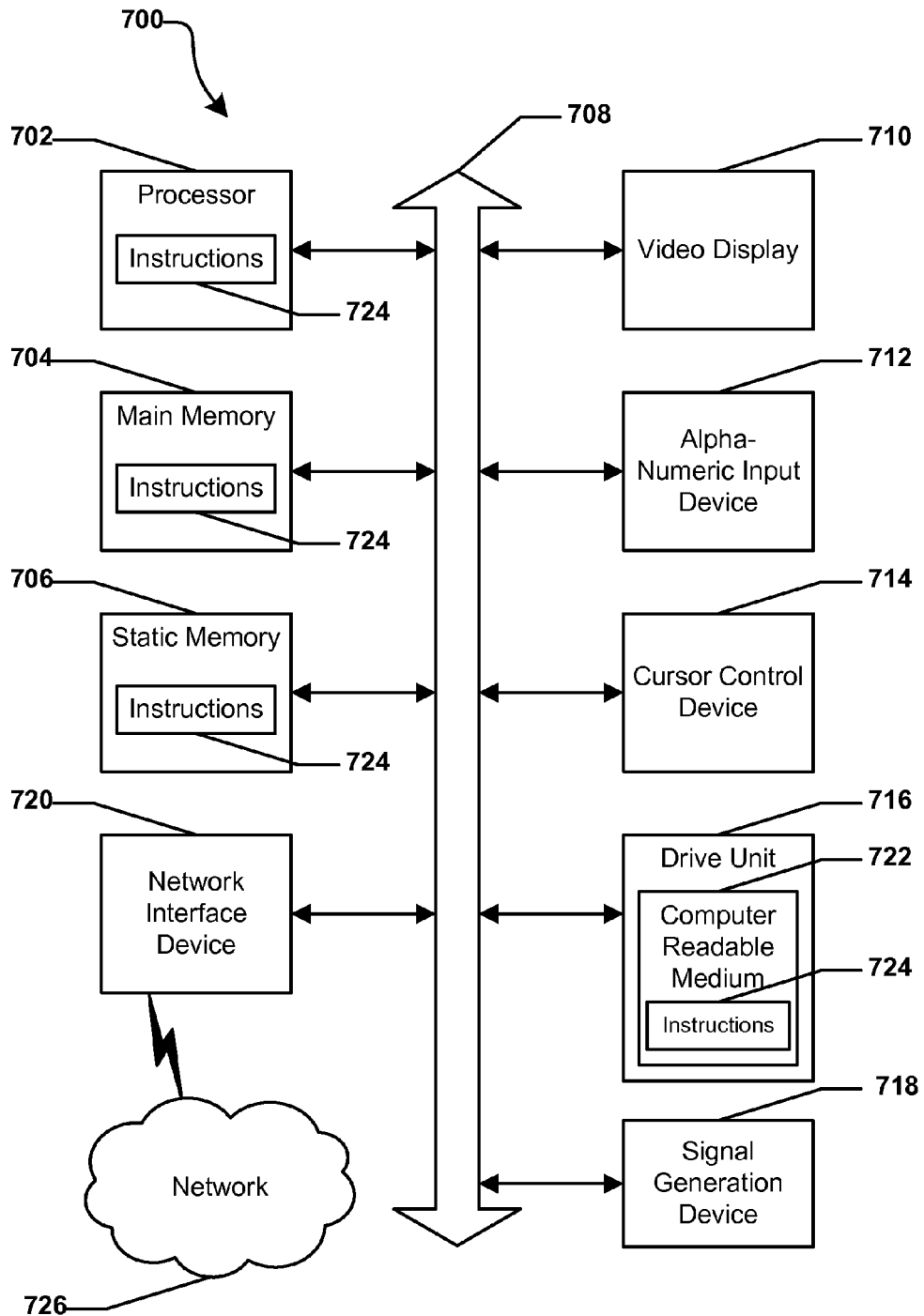
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set top box comprising:
a memory having computer instructions; and
a processor coupled with the memory, wherein executing the computer instructions causes the processor to perform the operations comprising:
  receiving at the set top box a digital video stream and a data stream, the digital video stream comprising I-frames, B-frames and P-frames, wherein the I-frames are decodable without reference to other frames in the digital video stream, and wherein the digital video stream is an encrypted digital video stream;
  calculating a first hash of a first I-frame and for each of the I-frames without location information and hash values for each of the B-frames and P-frames, the first I-frame included within the encrypted digital video stream, wherein the first hash is calculated without decrypting the encrypted digital video stream;
  submitting the first hash to a server at a media service provider, wherein the server has access to a database identifying a one to one correspondence between each member of a set of hashes of I-frames and a corresponding member of a set of location information, wherein the database identifies the one to one correspondence only for the I-frames of the encrypted digital video stream;
  receiving at the set top box a first location information member of the set of location information in response to submitting the first hash to the server, wherein the first location information is provided by the server having determined that the first hash is included in the set of hashes of I-frames, and identifying a location of the first I-frame within the digital video stream;
  providing the first location information to a video playback device;
  synchronizing the data stream and the digital video stream; and
  combining the portion of the data stream with the digital video stream.

2. The set top box of claim 1 wherein executing the computer instructions causes the processor to perform the operations comprising submitting a title corresponding to the digital video stream to the server.

3. The set top box of claim 1 wherein executing the computer instructions causes the processor to perform the operations comprising receiving instructions associated with the first location information.

4. The set top box of claim 1 wherein executing the computer instructions causes the processor perform the operations comprising:
  calculating a second hash of a second I-frame included within the digital video stream, the second I-frame temporally separated from the first I-frame by a third I-frame for which a hash is not calculated;
  submitting the second hash to the server; and
  receiving at the set top box second location information in response to submitting the second hash to the server, the second location information identifying a location of the second I-Frame within the digital video stream.

5. The set top box of claim 1 wherein the first hash is calculated utilizing a message digest algorithm.

6. A system comprising:
a database comprising location information and hash values for each of a plurality of I-frames of an encrypted digital video stream without location information and hash values for each of a plurality of B-frames and a plurality of P-frames of the encrypted digital video stream, wherein the database identifies a one to one correspondence between each member of a set of hashes of I-frames and a corresponding member of a set of location information, and wherein the database identifies the one to one correspondence only for the I-frames of the encrypted digital video stream;
a memory having computer instructions; and
a processor coupled with the memory, wherein executing the computer instructions causes the processor to perform operations comprising:
  calculating a first hash representing a first I-frame and for each of the I-frames without location information and hash values for each of the B-frames and P-frames the first I-frame included within the encrypted digital video stream, wherein the first hash obtained without decrypting the encrypted digital video stream;
  submitting the first hash to a server, wherein the server has access to the database;
  determining that the first hash is included in the set of hashes:
    retrieving first location information from the database in response to the determining, the first location information identifying a location of the first I-frame within the digital video stream; and
    providing the first location information to a video playback device, wherein the video playback device, responsive to receiving the first location information, synchronizes the digital video stream with a data stream and combines a portion of the data stream with the digital video stream.

7. The system of claim 6 wherein executing the computer instructions causes the processor to perform the operations comprising providing instructions associated with the location information to the video playback device.

8. The system of claim 6 wherein executing the computer instructions causes the processor to perform the operations comprising receiving a title from the video playback device.

9. The system of claim 6 wherein the database is located at a set top box associated with the video playback device.

10. The system of claim 6 wherein the database is located at a media service provider.

11. A method for synchronizing a digital video stream with a data stream, comprising:
　　receiving at a set top box a digital video stream comprising I-frames, B-frames and P-frames, wherein the I-frames are decodable without reference to other frames in the digital video stream, and a data stream, wherein the digital video stream is an encrypted digital video stream;
　　calculating at the set top box a first hash of a first I-frame and for each of the I-frames without location information and hash values for each of the B-frames and P-frames within the encrypted digital video stream, wherein the first hash is calculated without decrypting the encrypted digital video stream;
　　submitting the first hash to a server, wherein the server has access to a database identifying a one to one correspondence between each member of a set of hashes of I-frames and a corresponding member of a set of location information, wherein the database identifies the one to one correspondence only for the I-frames of the encrypted digital video stream;
　　retrieving at the set top box first location information corresponding to the first hash of the first I-frame from response to submitting the first hash to the server, wherein the first location information is provided by the server having determined that the first hash is included in the set of hashes of I-frames, and identifying a location of the first I-frame within the digital video stream;
　　determining at the set to box that the first hash is included in the set of hashes of I-frames;
　　determining at the set top box a portion of the data stream corresponding to the first location information;
　　identifying a location of the first I-frame within the digital video stream;
　　providing at the set top box the first location information to a video playback device;
　　synchronizing at the set to box the digital video stream with the data stream; and
　　combining at the set top box the portion of the data stream with the video stream.

12. The method of claim 11 wherein the data stream is a second digital video stream.

13. The method of claim 11 wherein the data stream is an audio stream.

14. The method of claim 11 wherein the data stream includes text corresponding to the digital video stream.

15. The method of claim 11 wherein retrieving the first location information includes submitting the hash of the first I-frame to a server at a media service provider, causing the server to retrieve the first location information from the database, the database stored at the server, and receiving the first location information from the server.

16. The method of claim 15 wherein retrieving the first location information further includes submitting a title corresponding to the digital video stream to the server.

17. The method of claim 15 wherein receiving the first location information from the server includes receiving instructions associated with the first location information.

18. The method of claim 11 wherein the database is included at the set top box and updated by a media service provider.

19. The method of claim 11 wherein the database is located at a server at a media service provider.

* * * * *